(No Model.)
D. D. BRIGGS.
HARNESS HOLDER.
No. 295,344.   Patented Mar. 18, 1884.
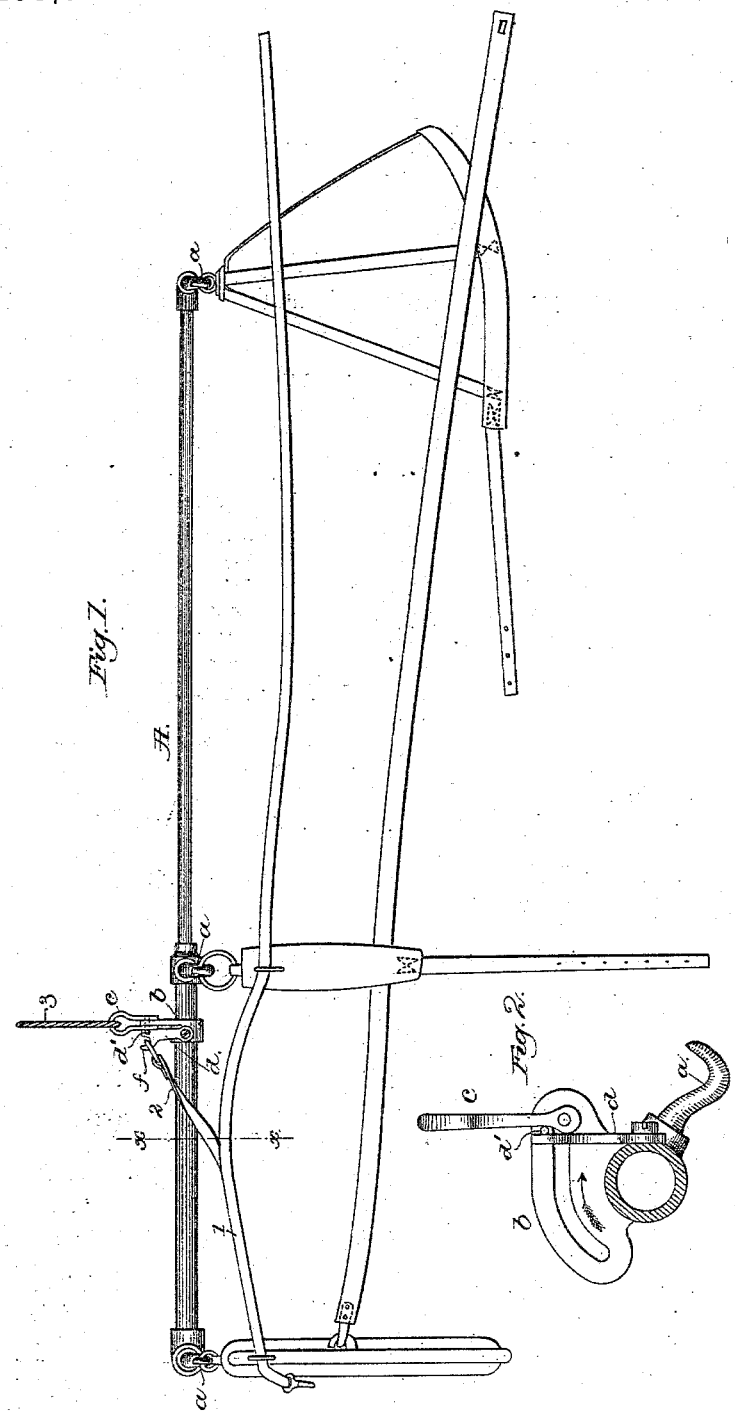
Witnesses.
John F. C. Prinkert
Henry Marsh
Inventor.
Daniel D. Briggs.
by Crosby & Gregory
attys

UNITED STATES PATENT OFFICE.

DANIEL D. BRIGGS, OF NEW BEDFORD, MASSACHUSETTS, ASSIGNOR OF ONE-HALF TO FREDERICK MACY, OF SAME PLACE.

HARNESS-HOLDER.

SPECIFICATION forming part of Letters Patent No. 295,344, dated March 18, 1884.

Application filed January 18, 1884. (No model.)

*To all whom it may concern:*

Be it known that I, DANIEL D. BRIGGS, of New Bedford, county of Bristol, and State of Massachusetts, have invented an Improvement in Harness-Holders, of which the following description, in connection with the accompanying drawings, is a specification, like letters on the drawings representing like parts.

This invention relates to harness-holders, and is especially adapted for use in fire departments to aid in the quick and easy harnessing of a horse, when necessary, as in the case of a fire.

My invention has for its object to hold the ordinary single harness in an elevated position to permit the animal to easily pass under and get in position beneath said harness, when by the movement of the driving-rein in being secured to the bridle the harness is released from the holder, and said holder is elevated out of the way by the ordinary weighted rope or chain suspended from the ceiling, the said rope at one end engaging a support for the holder.

To this end my invention in harness-holders consists, primarily, of a rod properly balanced, and provided at one side of its longitudinal center with a series of hooks adapted to support the collar, saddle, and rear part of a harness in position to be dropped directly upon a horse, and a supporting device for the rod, combined with a catch or latch to hold the rod with its hook turned upward to sustain the harness, the said catch or latch, when withdrawn from contact with the said supporting device, permitting the hooks to turn down and discharge the harness. The rod is provided with a sector slotted for the reception of the supporting device, shown as a link, upon which the sector and rod hang, and connected with the said rod is a releasing device, (shown as a pivoted latch,) substantially as will be hereinafter more fully described, and particularly pointed out in the claims.

Figure 1 is a side elevation of my improved harness-holder, showing a single harness supported thereby in an elevated position; and Fig. 2, a cross-section on the line $xx$, Fig. 1, with the harness omitted, the said figure showing the slotted sector in elevation.

The rod A, which is preferably of iron, is provided with a number of hooks, $a$, projecting from one side thereof, and so located or disposed as to receive the usual collar, back-strap, or saddle, and breeching of a single harness, such as commonly used in a fire department. The rod A is preferably properly weighted at a suitable point to enable the rod, with harness applied thereto, to remain balanced. The slotted sector $b$, in the present instance secured to the rod A a short distance in front of the hook that supports the saddle, receives or engages the supporting device $c$ for the holder, the said support being shown as a loop, a part of which enters the slot of the said sector, and is locked in position at one end of its slot by means of a catch or latch, $d$, pivoted upon a part of the sector or of the rod, and provided, as herein shown, with a pin, $d'$, to engage a perforation or hole in the sector, as indicated in Fig. 1. The catch or latch $d$ is further provided with a suitable hook or eye, $f$, adapted to be engaged by a ringed strap, 2, secured to a part of the harness—preferably one of the driving-reins. The catch or latch $d'$ is preferably pivoted to the bearing of the sector at the side nearest the hooks $a$, and when the harness is supported in an elevated position the support $c$ is also held or locked at the same side of the rod as in Figs. 1 and 2.

The parts are constructed and adapted to sustain the harness in position, substantially as shown in Fig. 1, with the ringed strap 2 engaging the hook $f$. The supporting device or loop $c$ will be engaged by the usual weighted rope, 3, extended over suitable pulleys, and adapted to be raised and lowered, as usual. When the harness is supported in its elevated position, as shown, the weight of the rod and the disposition of the hooks and sector are such as to preserve said rod in a balanced position, and the animal being in position beneath the harness, the operation of parts to release the harness from the holder to secure the same about the animal is as follows, viz: As the harness is being pulled down onto the animal, the driving-rein is drawn forward to engage its strap with the bit-ring of the bridle, the pull on which will be communicated to the ringed strap 2, engaging the hook $f$, and will turn the catch or latch $d'$ on its pivot, withdrawing its pin from the perforation in the slotted sector, thus freeing the link c from its locked position at one end of the slotted sector. As soon as this is accomplished, the weight of the harness causes the rod to partially rotate while in a suspended condition, whereupon the slotted sector, traveling in the direction of the arrow on the supporting device c, will enable the harness to fall from the hooks a in position to be immediately fastened about the horse.

The latch d is pivoted, as herein shown, to engage the front side of a slotted sector; but it is obvious that it might be pivoted at the opposite side of the said sector, in which case the ringed strap 2 would not be connected with the reins 1 at a point back of the back-strap or saddle, so that the latch would be disengaged from the sector as the reins are caught by the driver in the seat.

I claim—

1. In a harness-holder, a rod provided at one side of its longitudinal center with a series of hooks adapted to support the collar, saddle, and rear part of a harness in position to be dropped directly upon a horse, and a supporting device for the rod, combined with a catch or latch to hold the rod with its hooks turned upward to sustain the harness, the said catch or latch, when withdrawn from contact with the said supporting device, permitting the hooks to turn down and discharge the harness, substantially as described.

2. The rod A, provided with several hooks, a, projecting from one side thereof, and having an attached slotted sector, combined with a supporting device adapted to engage the said slot, and with a catch or latch, adapted to operate substantially as and for the purpose set forth.

3. The balanced rod A, provided with the hooks a, projecting from one side thereof, and the slotted sector b, and the supporting device c, one end of which engages the slot of the said sector, and the catch or latch d, adapted to lock the supporting device in that end of the slot of the sector contiguous to the hooks a, and with means to operate the catch or latch to release the sector that it may turn on the supporting device, all substantially as shown and described, and for the purpose set forth.

In testimony whereof I have signed my name to this specification in the presence of two subscribing witnesses.

DANIEL D. BRIGGS.

Witnesses:
JAS. C. S. TABER,
CHAS. E. DRAKE.